United States Patent [19]
Davidson et al.

[11] Patent Number: 4,935,139
[45] Date of Patent: Jun. 19, 1990

[54] COMPOSITE MEMBRANES

[75] Inventors: Alexander P. Davidson, Shipston-on-Stour; Michael P. Thomas, Banbury, both of England

[73] Assignee: Alcan International Limited, Montreal, Canada

[21] Appl. No.: 354,743

[22] Filed: May 22, 1989

[30] Foreign Application Priority Data

May 24, 1988 [GB] United Kingdom ................ 8812217

[51] Int. Cl.$^5$ .............................................. B01D 13/00
[52] U.S. Cl. ............................... 210/490; 210/500.25; 210/500.26
[58] Field of Search ...................... 210/500.25, 500.26, 210/490; 427/245, 246

[56] References Cited

U.S. PATENT DOCUMENTS 4,711,719 12/1987 Leenaars et al. ............... 210/500.26
4,762,619 8/1988 Gaddis et al. .............. 210/500.25 X Primary Examiner—Frank Spear
Attorney, Agent, or Firm—Cooper & Dunham

[57] ABSTRACT

A composite membrane comprises a porous metal support and at least one porous inorganic film of sintered non-metallic particles carried by the support and overlying a surface thereof. The film is in longitudinal compression at ambient temperature, such that any cracks tend not to propagate. The composite membranes are mechanically robust and chemically inert and useful as filters e.g. in the food industry. They may be made by applying a sol or suspension of particles to form a layer on the porous metal support and heating the coated support to partly sinter the particles of the layer.

11 Claims, No Drawings

COMPOSITE MEMBRANES

This invention concerns composite membranes which are suitable for separation and filtration processes.

EPA No. 242208 describes composite membranes comprising a porous inorganic support and a microporous inorganic film overlying a surface of the support. The supports there envisaged are of alumina, particularly sheets of anodic aluminium oxide. Such composite membranes have advantages of chemical inertness, a rather uniform pore size, substantial freedom from cracks or pinholes, and high flux, and have been commercially successful. But they do suffer from a few disadvantages: they are somewhat expensive and fragile; they are not plastically deformable, and cannot easily be shaped; if cracks do form, they tend to propagate; and they are difficult to attach e.g. to filter supports. It is an object of this invention to provide composite membranes which reduce or overcome these disadvantages.

FR No. 2,550,953 and EPA No. 188950 both describe permeable membranes formed by applying a sol to a porous support, gelling the sol and heating the gel. Both specifications mention the possibility of using a porous metal support, but do not develop or exemplify the idea.

U.S. Pat. No. 3,022,187 and GB No. 1,173,179 describe porous metal support membranes whose pores are impregnated with a microporous inorganic non-metallic material.

This invention is based on the idea of providing a composite membrane comprising a porous metal support and at least one porous inorganic film of sintered non-metallic particles. The film is carried by the support and overlies a surface thereof. Penetration of the film-forming materials into the pores of the support would result in uneven thickness and a thicker film than is desirable. The film is bonded to the support and is, at ambient temperature, in biaxial compression; this feature gives rise to the advantage that, if the film is accidentally cracked or damaged, the crack tends not to propagate and does not necessarily give rise to catastrophic failure of the membrane as a filter.

In another aspect the invention provides a method of making the composite membrane described. The method involves applying, to a surface of a porous metal support membrane, a sol or suspension of particles to form thereon a layer that does not substantially penetrate the pores of the support. The coated support is then heated to partly sinter the particles of the layer to form the desired porous film bonded to the support.

In a preferred embodiment, the composite membrane is plastically deformable without cracking. A membrane is defined as being plastically deformable without cracking if it can be plastically deformed by being bent, while this deformation is defined as being "without cracking" if the resulting membrane is still usable for separation and filtration processes of the kind envisaged. Any deformation necessarily damages microporous films of e.g. refractory oxides. In membranes according to the invention, such damage is contained and is not such as to make them unusable. By contrast, conventional ceramic membranes just cannot be plastically deformed at all.

The support has a coefficient of linear expansion at least as great as, and desirably greater than, that of the microporous film. This feature has the following consequence. The composite membrane first comes into existence at the elevated temperature at which it is heated to convert the gel to a micro-porous inorganic film. On subsequent cooling, the support shrinks faster than the film, with the result that the film is under biaxial compression, that is to say, compression in two dimensions in the plane of, rather than perpendicular to, the film. As a result, any cracks that do develop in the film, due to damage or deformation, tend to close rather than to propagate.

The support is of metal. The nature of the metal is not very critical, as nearly all metals are plastically deformable and have a higher coefficient of linear expansion than do refractory oxides. One suitable metal is stainless steel. The support may take several different forms, including a sintered metal powder.

In a preferred embodiment, the support comprises sintered metal having an average pore size of from 1 to 10 microns. The support may, but need not, consist entirely of sintered metal particles. A commercially available product comprises a coarsely woven stainless steel mesh with the interstices filled with sintered metal particles. In supports of this kind, the pores are generally long compared to their diameter and if penetrated by sol might become completely blocked. It is therefore necessary that the composite membrane be prepared, e.g. by adjusting the viscosity of the sol, in such a way that the micro-porous film overlies one surface of the support, with little or no penetration of the pores of the support. Here also, the pore size and surface roughness of the support have been found to be less important than was previously believed to be the case, and supports with average pore size of 5 to 10 microns and/or surface roughness greater than 2 microns are suitable.

This support is overlain by a porous film of sintered non-metallic particles. Porous films include those suitable for separation and filtration processes including the ultra-filtration and micro-filtration ranges. Ultra-filtration is generally accepted to be defined by retention of molecules or particles of the size range 20 nm down to 1 nm (1 nm = 1 nanometer = $10^{-9}$ m). An alternative way of expressing this filtration range is by converting molecular size to molecular weight: on this basis it is the retention of species in the molecular weight range of 300,000 to 300. Micro-filtration is generally accepted to cover the size range of 20 nm up to 2000 nm (i.e. 0.02 to 2 microns). Although there is no critical upper limit, the porous films preferably have an average pore diameter not more than the average diameter of the pores of the support.

The films may be of sintered non-metallic particles, for example titania, alumina, ceria, zirconia, lead zirconate titanate (PZT), silica, mullite, refractory metal oxides generally, and mixtures thereof. Such films can be formed by techniques generally known, by applying a suspension of the particles or precursors thereof to the support, dewatering the suspension, and heating the resulting layer to a temperature to partially sinter the particles. Where the particles are of sub-micron size, this technique may involve applying a sol to the support, converting the sol to a gel and heating the gel. It is necessary that the contact area between the particles and the surfaces of the support be sufficiently great for the two to adhere together so that the films are bound to the support. This requirement places an upper limit on the permissible size of the particles.

Where the film is formed from a suspension, this may comprise 60–95%, preferably 75–90%, by weight of relatively larger particles, the balance being of much smaller particles. The larger particles may have an average size in the range 0.5–50 microns, particularly 1–10 microns, chosen to generate films with pores of desired size. The smaller particles may have an average size in the range 4 nm up to 1 micron, but not more than 0.1 times the size of the larger particles. The smaller particles act as a sintering aid, permitting the film to be sintered at lower temperatures than would other-wise be possible. They also improve adhesion between the films and the support. The proportions of the smaller particles should not be so great as to substantialy block the pores between the larger particles.

One embodiment of the invention involves using a colloidal sol of an inorganic material (such as a ceramic oxide) or a solution of a polymeric precursor to an inorganic material (such as a ceramic oxide) to the support. The colloidal sol may be derived by known means from an inorganic oxide powder, such as an oxide of the elements mentioned above. More preferably the colloidal sol or polymeric solution is derived by hydrolysis of a metal alkoxide. For example, boehmite sols may be prepared using the procedure described in U.S. Pat. No. 3,944,658. According to this procedure, an aluminium alkoxide is hydrolysed in an excess of water maintained at 80° C., and subsequently peptized with an acid, to form a clear transparent sol. The sol consists of colloidal particles of stable crystalline aluminium monohydrate, AlO(OH), dispersed in the aqueous phase. The sol so produced typically contains about 30 gl$^{-1}$ of aluminium values expressed as $Al_2O_3$, and can be adjusted to the desired concentration for coating by dilution with water or evaporation. Coatings may be achieved with sols of concentration up to 190 gl$^{-1}$, preferably 10 gl$^{-1}$ to 90 gl$^{-1}$, of aluminium values expressed as $Al_2O_3$. The sols may be hydrothermally treated to increase particle size and hence viscosity. A typical treatment would be to heat for 3 hours at 200° C. in an autoclave. As an alternative example, -Ti-O-Ti- polymer solutions may be prepared using a procedure similar to that described in the article by C J Brinker and M S Harrington in Solar Energy Materials, 1981, volume 5, 159–172, wherein a titanium alkoxide is partially hydrolysed in an alcoholic solution at room temperature in the presence of an acid catalyst to form a stable -Ti-O-Ti- polymer solution. The solution so produced typically contains about 10 to 30 gl$^{-1}$ of titanium values expressed as $TiO_2$, and can be adjusted to the desired concentration for coating by evaporation of solvent or further dilution with alcohol. The sol or solution can be applied to the support in the freshly concentrated state, or aged to increase its viscosity prior to application. Control over the film thickness in the composite membrane can be achieved in part by control over the concentration and viscosity of the sol prior to application.

When it is derived from a sol, the porous film overlying the support is preferably of substantially uniform thickness from 0.05 to 10 microns, particularly from 0.1 to 5 microns. Above 10 microns thickness there is a risk of "mud-cracking" of the porous film. The thicker the porous film, the lower is the liquid flux obtainable through it on filtration, and for this reason a preferred maximum limit is set at 2 microns.

When the film is derived from a suspension, the minimum film thickness is related to particle size and is typically three times the average particle size (excluding any sintering aid).

The films contain pores of substantially uniform pore size, preferably substantially free of cracks and pinholes. The average pore size is preferably from 0.5 nm to 5 microns but less than that of the support, particularly from 3 nm to 1 micron and pores more than twice the average size are preferably substantially absent.

Various techniques are known for preventing the sol or supsension from penetrating the pores of the support. One solution (described in Canadian patent specification No. 1,196,873) is to provide an organic binder in the pores of the support, either all through the support, or alternatively at the surface to which the sol or suspension is applied. The coated support is then fired to volatilise or burn off the organic binder, and to partly sinter the particles of the coating layer. Another solution (described in our British patent application Ser. No. 8,910,577.9 filed on 8 May 1989) involves applying a non-porous fugitive film to the back surface of the support membrane, prior to applying the sol or suspension of particles to the front surface. Air trapped in the pores of the support prevents penetration of the sol or suspension. On heating, the fugitive layer is easily volatilised or burned off the back surface.

However, it is not necessary to render the support non-porous in this way. Further in order to prevent the ingress of the sol or suspension it is possible to increase its viscosity. This can be done simply by adding a relatively viscous miscible organic liquid. Alternatively, a relatively viscous relatively high boiling point liquid, for example a polymer such as polyvinyl alcohol or a polyol such as ethylene glycol or glycerol, may be added and thereafter heated to remove some or all of the less viscous liquid but without breaking down the sol or suspension of inorganic material.

Addition of a binder may be helpful, particularly in cases where the sol or suspension has to bridge the rather coarse pores of the support. Various materials can be used for this purpose, including polyvinyl alcohol and methyl cellulose. In addition to thickening the sol or suspension, a material of this kind may act as a film-forming binder, or may, particularly in the case of methyl cellulose, act as a wetting agent. Suitable concentrations are readily determined by experiment, and are likely to be in the range of 10 to 50 gl$^{-1}$.

Addition of a surface active agent to the sol or suspension prior to application aids the formation of thin uniform layers. Non-ionic surfactants such as Nonidet (Octylphenyl ethylene oxide condensate supplied by BDH Chemicals), or Methocel (methyl cellulose polymer supplied by Dow Chemical Company) added typically at the concentration level of 0.1 to 1 percent by weight, can result in thinner layers than are otherwise obtained.

The layers can be formed on the support by deposition of a concentrated sol or suspension followed by air drying. Various techniques including brush, spray, dip, spin coating, electrophoretic and thermophoretic techniques may be used to apply the sol to the support. Spray coatings can be applied using an aerosol method. A sintered support is suspended vertically to permit excess sol to drain off and spraying is conducted until full coverage of the surface is achieved.

To prepare spin coated composite membranes, a sintered support can be attached horizontally to the platen of a commercially available spin coating unit. A known quantity of the concentrated sol or suspension is applied to the support surface and is permitted to reside thereon for a predetermined period of time typically up to 60 seconds. Excess is removed by spinning the coated support, typically at a speed from 200 to 2000 rpm. The thickness of the film is controlled by the concentration and age of the sol or suspension, it residence time on the support surface, and the spin speed and spin time.

The sol or suspension may include a powder passenger, such as flame hydrolysed alumina or graphite, as a crack inhibitor.

The freshly coated support is then heated to transform the layer into a microporous refractory film. For example, heating converts a boehmite gel layer into a mechanically stable gamma-$Al_2O_3$ structure. Heating conditions are not critical to the invention and may be conventional, bearing in mind the need to avoid thermal shock which might result in the formation of cracks or pin-holes. A typical heating schedule for a boehmite gel layer might be: (a) heating at 50° C. per hour to 200° C. followed by isothermal treatment at 200° C. for 15 minutes, (b) subsequent heating at 200° C. per hour to 450°–650° C. followed by an isothermal hold for 15 minutes, (c) cooling at 50° C. per hour to room temperature. The first part of the heating schedule up to 200° C. is designed to remove absorbed water; the second stage to 450°–650° C. removes bound water, burns of any binder and transforms the gamma-AlOOH to gamma-$Al_2O_3$. This transformation occurs at temperatures at or above 390° C. Finally, the individual isolated particles of alumina sinter together, eventually becoming fully dense if a high enough temperature is reached. At high temperatures, organic binders burn out and may leave voids which contribute to porosity. If these are not desired, it may be preferred to apply a final coating of a sol not containing any organic binder.

On cooling to room temperature, the metal support contracts more than the porous (e.g. refractory oxide) film. The physical dimensions of the porous film were defined at the sintering temperature and matched those of the support at that temperature. So long as the film is sufficiently well bonded so as not to spall off, the major stressing of the film is compressive, an ideal situation from the viewpoint of a ceramic structural component. Thus, when the porous film is subjected to a high pressure difference in use, it will only be loaded in tension when the original compressive pre-loading, which can be predicted and controlled in advance, is backed off to a sufficient degree.

The following advantages should be noted for various embodiments of the invention:

(a) The composite membranes are plastically deformable without cracking, and are therefore less likely to suffer from handling abuse.

(b) Although defects are inevitable in porous films formed of refractory oxides, these defects do not propagate, because the microporous film is in longitudinal compression rather than tension at ambient temperature.

(c) Supports of sintered metal are cheap compared to ceramic supports.

(d) Metal supports are easily fixed, e.g. by welding, crimping or brazing, to a rigid metallic support structure, either before or after application of the microporous film.

(e) Plastically deformable supports can be profiled to create vortices in the fluid being filtered so as to avoid blockage, e.g. as described in U.S. Pat. No. 4,075,091.

(f) Metal supports are electrically conductive, and porous films can be made electrically conductive e.g. by using a doped titania sol or by incorporating in them a minor proportion of graphite or other powdered conductor.

(g) The composite membranes are easily sterilised by heat or otherwise, and have excellent chemical resistance. These features make them particularly suitable for use as filters e.g. in the food and chemical industry.

The invention is supported by the following experimental work.

EXAMPLE 1

Materials

(A) Substances

Sintered stainless membranes of pore size ~2 μm were obtained from Pall Porous Metal Products in the form of sheets 0.5 m × 0.2 m × 140 μm thick.

The substrates were prepared for coating by preheating in a solution of 7 parts sodium dichromate, 7 parts sulphuric acid and 400 parts water at 70° C. for 15 minutes. This is a standard pretreatment for adhesive bonding of stainless steels.

(B) Sol composite and concentration

Boehmite sols of concentration 30 $gl^{-1}$ were prepared as described. 500 ml aliquots of the sols were hydrothermally processed in a 2 litre capacity autoclave for 3 hours at 200° C. The 90 $gl^{-1}$ sols were prepared by thermal evaporation (at 80° C.) of the hydrothermally processed 30 $gl^{-1}$ sols.

(C) Binder Composition

Polyvinyl alcohol (PVA) and methyl cellulose (Methocel) binders were obtained in the form of powders.

EXPERIMENTAL PROCEDURE

(i) Determination of optimum binder composition and concentration

The binders were diluted with water and added to boehmite sols of concentration 30 $gl^{-1}$ or 90 $gl^{-1}$ alumina. The excess water introduced with the sols with the binders was removed by evaporation.

A minimum binder addition of 10% to the 90 $gl^{-1}$ sol was required in order to yield an appreciable increase in viscosity. Addition of greater than 50 w/o binder resulted in gelation. Optimum binder additions were determined to be ~18 w/o for the 90 $gl^{-1}$ sol and ~40 w/o for the 30 $gl^{-1}$ sol. Both binders were selected for further study, as their effect on sol viscosity was similar. 30 $gl^{-1}$ and 90 $gl^{-1}$ concentration boehmite sols, with or without binder, were deposited successfully by spray-coating as thin films onto Pall porous metal filters. Multiple spraying with up to 5 coats was necessary to ensure a complete coating. The maximum film thickness obtained was 10 μm. Above this the film cracked.

Following coating, the sol-gel films formed within the metal substrates were examined in the gel state using optical and scanning electron microscopy (SEM). The composites were calcined using the following heating schedule: heating at 50° C./hour to 200° C., holding 1 hour, heating at 50° C./hour to 450° C., holding 1 hour, followed by a slow furnace cool to room temperature. The calcined samples were examined for coating integrity and thickness using optical microscopy and SEM, and recoated and calcined if cracks were observed.

From the fact that the X-ray diffraction pattern is distorted, it is possible to deduce that the inorganic film overlying the support was in longitudinal compression. This feature could be demonstrated by dissolving away the support and observing the composite membrane to curl.

EXAMPLE 2

A piece of Pall porous stainless steel was pretreated by immersion in a solution of 7 parts sodium dichromate, 7 parts sulphuric acid and 400 parts water at 71° C. for 15 minutes. 500 ml of a boehmite sol of concentration 30 g/l was hydrothermally processed for 3 hours at 200° C. in a 2 litre hydrothermal autoclave. Flame hydrolysed alumina powder was added to the sol to a concentration of 50 weight %. The sol was spray coated onto the surface of the Pall metal filter using an aerosol method. Deposition was continued until complete coverage of the metal filter had occurred. The sol was permitted to gel, and the coating process repeated. The composite membrane was calcined by heating in air using the following heating schedule: 50° C./hour to 200° C.; holding for 1 hour; 50° C./hour to 450° C.; holding for 1 hour; furnace cooling to room temperature.

A 25 mm diameter sample of the material was sealed into a holder with a Viton 'O'-ring. Thus the membrane separated two chambers, each of which had a single port. Helium gas was then fed into one chamber under pressure; it diffused through the ceramic membrane and passed out of the other chamber through a non-return valve. The helium gas-flow rate was controlled in the range 10 ml to 100 ml/min. normalized to standard temperature and pressure. This was done by using a commercially available mass flow controller. The pressure drop across the membrane needed to maintain the set flow rate was then measured with a differential pressure gauge. By plotting graphs of differential pressure against flow-rate for both samples and obtaining linear relationships passing through the origin over the complete range of flow-rates, it was demonstrated that there was no significant leakage of Helium gas around the 'O'-ring seal. By performing replicate experiments and obtaining, within normal experimental variance, identical results, it was judged that the specimens had not suffered any cracking of the ceramic component during the first test. This was confirmed by light microscopical examination of the samples after they had been removed from the experimental cell. The temperature at which the experiment was carried out was 40° C. and the effective diameter for gas permeation was 22 mm.

The result of the test was as follows; quoted in units of flux per unit pressure difference across each membrane.

EXAMPLE 2

940 ml/min/cm$^2$/Bar

EXAMPLE 3

A sample of Pall porous stainless steel membrane was pretreated according to the procedure described in Example 2. The membrane was spray coated, using an aerosol method, with a mixture of hydrothermally processed 30 gl$^{-1}$ boehmite sol and 20 gl$^{-1}$ polyvinyl alcohol, until complete coverage of the membrane by the sol was achieved. Heat treatment using the schedule described in the previous examples yielded a composite membrane comprising a metal substrate with a thin sol-gel surface film of thickness less than 10 microns. The membrane was plastically deformed by bending through 20° permanent deformation around a cylindrical former of radius 3 mm, such that the sol-gel film was on the convex surface of the membrane. Scanning electron microscopy of the deformed area revealed short fine cracks in the sol-gel film along the ridges of the bend. The sol-gel film remained well adhered to the metal substrate, and no spalling of the film occurred.

EXAMPLE 4

A sample of Pall porous stainless steel membrane was pretreated, coated and heat treated according to the method described in Example 3. The membrane was plastically deformed by bending through 5° of permanent deformation around a former of radius 10 mm, such that the sol-film was on the concave surface of the membrane. Scanning electron microscopy of the deformed region revealed no evidence of cracking or removal of the sol-gel film.

X-ray diffraction studies establish that the porous films of the composite membranes of all the Examples are in biaxial compression at ambient temperature.

EXAMPLE 5

8 g of SnCl$_4$ 5H$_2$O were dissolved in 25 ml of H$_2$O and further diluted to 90 ml with water to yield a solution with an equivalent concentration of 38 gl$^{-1}$ of SnO$_2$. 4.2 ml of this solution was added to 21 ml of indium sol prepared according to British Pat. No. 1,351,113, concentrated to 84.6 gl$^{-1}$ In$_2$O$_3$. This doped sol was referred to as mixture A. A mixture of identical composition, mixture 3, having a total volume of approximately 1 litre, was spray dried under the following conditions: inlet temperature 200° C., outlet temperature 90° C., spray rate 2.5 l/hour. This yielded 104 g of spray dried powder containing 73 wt % of mixed oxides, of particle size less than or equal to 15 μm.

After calcination at 500° C. the spray dried powder was ball milled for 24 hours to reduce the particle size to less than 0.5 microns. 23.9 g of this powder was added to mixture A to form a feed dispersion containing 93% solids with a viscosity of 54 centipoise and a concentration of 923 gl$^{-1}$ of mixed oxides.

The feed dispersion was sprayed onto a porous stainless steel membrane (pore size 2–6 microns), which had been cleaned and pretreated by immersion for 16 hours in a solution of sodium dichromate, sulphuric acid and water. Heat treatment (the coated membrane has heated and cooled at 50° C./h) at 800° C. in air for 2 hours transformed the coating into a microporous indium-tin oxide film of thickness less than or equal to 10 microns. The pore size of the coating was less than 0.1 microns, and it displayed an electrical conductivity after heat treating in air of 10 (Ohm cm)$^{-1}$.

EXAMPLE 6

6 g of methyl cellulose was dissolved in 75 ml of distilled and deionised water. 47.25 g of this mixture was combined with 52.75 g water, 31.5 g of zirconia powder of mean particle size less than 2 microns and 3.5 g of zirconia powder of mean particle size less than 0.2 microns. The slurry this formed was ball-milled for 3 hours. 25 mm diameter discs were cut from a sheet of microporous stainless steel membrane (2 micron nominal pore size, Mott Metallurgical Corporation). The discs were pre-treated by dipping for 30 seconds in a 5% solution of sodium silicate, followed by air drying. A brush method was used to coat the discs with ceramic slurry.

After coating the discs were air dried. To ensure complete coverage the coating procedure was repeated.

Heat treatment for 1 hour at 950° resulted in a composite metal-ceramic structure whereby the ceramic slurry was well adhered to the metal discs. The membrane was examined by optical microscopy and SEM which revealed that the coating was complete and 30 microns thick.

We claim:

1. A composite membrane comprising a porous metal support and at least one porous inorganic film of sintered non-metallic particles carried by the support and overlying a surface thereof, the film being in biaxial compression at ambient temperature.

2. A composite membrane as claimed in claim 1, which is plastically deformable without cracking.

3. A composite membrane as claimed in claim 1, wherein the inorganic film is formed by a sol-gel technique.

4. A composite membrane as claimed in claim 1, wherein the film has a thickness of 0.05 to 10 microns.

5. A composite membrane as claimed in claim 1, wherein the support comprises sintered metal having an average pore size of from 1 to 10 microns.

6. A composite membrane as claimed in claim 1, wherein the film has an average pore size of 0.5 nm to 5 microns but less than the support.

7. A composite membrane as claimed claim 1, wherein the film is of alumina.

8. A method of making the composite membrane claimed in any claim 1, which method comprises providing a porous metal support membrane, applying to a surface thereof a sol or suspension of particles to form thereon a layer that does not substantially penetrate the pores of the support, and heating the coated support to partly sinter the particles of the layer.

9. A method as claimed in claim 8, wherein oxide or hydrated oxide sol is applied to a surface of the membrane and there converted to a gel which is dried and heated to convert it to the porous inorganic film.

10. A method as claimed in claim 8, wherein there is used a suspension of 60-955 by weight of relatively larger particles, and correspondingly from 40-5% of relatively smaller particles to act as a sintering aid.

11. A method as claimed in claim 8, wherein the support is formed or profiled into a desired shape prior to application of the sol or suspension.

* * * * *